(12) United States Patent
Molander et al.

(10) Patent No.: US 8,588,998 B2
(45) Date of Patent: Nov. 19, 2013

(54) RANGE ESTIMATION DEVICE

(75) Inventors: Sören Molander, Linköping (SE); Erik Petrini, Stockholm (SE); Bengt-Göran Sundqvist, Linköping (SE)

(73) Assignee: SAAB AB, Linköping (SE)

( * ) Notice: Subject to any disclaimer, the term of this patent is extended or adjusted under 35 U.S.C. 154(b) by 159 days.

(21) Appl. No.: 13/128,892

(22) PCT Filed: Nov. 11, 2009

(86) PCT No.: PCT/SE2009/051289
§ 371 (c)(1),
(2), (4) Date: Jun. 30, 2011

(87) PCT Pub. No.: WO2010/056192
PCT Pub. Date: May 20, 2010

(65) Prior Publication Data
US 2011/0264309 A1   Oct. 27, 2011

(30) Foreign Application Priority Data
Nov. 12, 2008 (EP) .................................. 08168902

(51) Int. Cl.
*G08G 5/04* (2006.01)
(52) U.S. Cl.
USPC ..... 701/11; 701/3; 701/4; 340/961; 244/76 R
(58) Field of Classification Search
None
See application file for complete search history.

(56) References Cited
U.S. PATENT DOCUMENTS

| 5,581,250 | A | 12/1996 | Khvilivitzky |
| 6,510,388 | B1 | 1/2003 | Sporrong et al. |
| 2004/0027257 | A1 | 2/2004 | Yannone et al. |
| 2007/0210953 | A1 | 9/2007 | Abraham et al. |
| 2010/0256909 | A1* | 10/2010 | Duggan et al. ................ 701/301 |

FOREIGN PATENT DOCUMENTS

| EP | 0 436 213 A | 7/1991 |
| EP | 1 471 365 A | 10/2004 |
| EP | 2 037 408 A1 | 3/2009 |
| WO | WO 2006124063 A2 | 11/2005 |

OTHER PUBLICATIONS

International Search Report, Feb. 17, 2009, issued in connection with counterpart International Patent Application No. PCT/SE2009/051289.
Written Opinion of the International Searching Authority, Feb. 17, 2009, issued in connection with counterpart International Patent Application No. PCT/SE2009/051289.
Search Report issued by the European Patent Office, Mar. 6, 2009, issued in connection with counterpart European Patent Application No. 08168902.8.
Shakernia, et al., "Passive Ranging for UAV Sense and Avoid Applications," *AIAA Infotechdiam Erospace Conference*, pp. 1-10, Sep. 26, 2005.
Erlandsson, "Angle-Only Target Tracking," Thesis, Linköpings Universitet, Mar. 19, 2007.

* cited by examiner

*Primary Examiner* — Khoi Tran
*Assistant Examiner* — Ryan Rink
(74) *Attorney, Agent, or Firm* — Venable LLP; Eric J. Franklin

(57) ABSTRACT

A range estimation device for use in an aerial platform including at least one passive sensor, a trajectory determination unit and a control system. A control unit is arranged to indicate to the control system to perform own-ship maneuvering of the aerial platform such that characteristics of passive sensor measurements from the at least one passive sensor enable a range estimation to a target to be determined. The control unit is arranged to determine characteristics of the own-ship maneuvering based on the range uncertainty estimations to the target. A method and a computer program product for use in range estimation device.

19 Claims, 9 Drawing Sheets

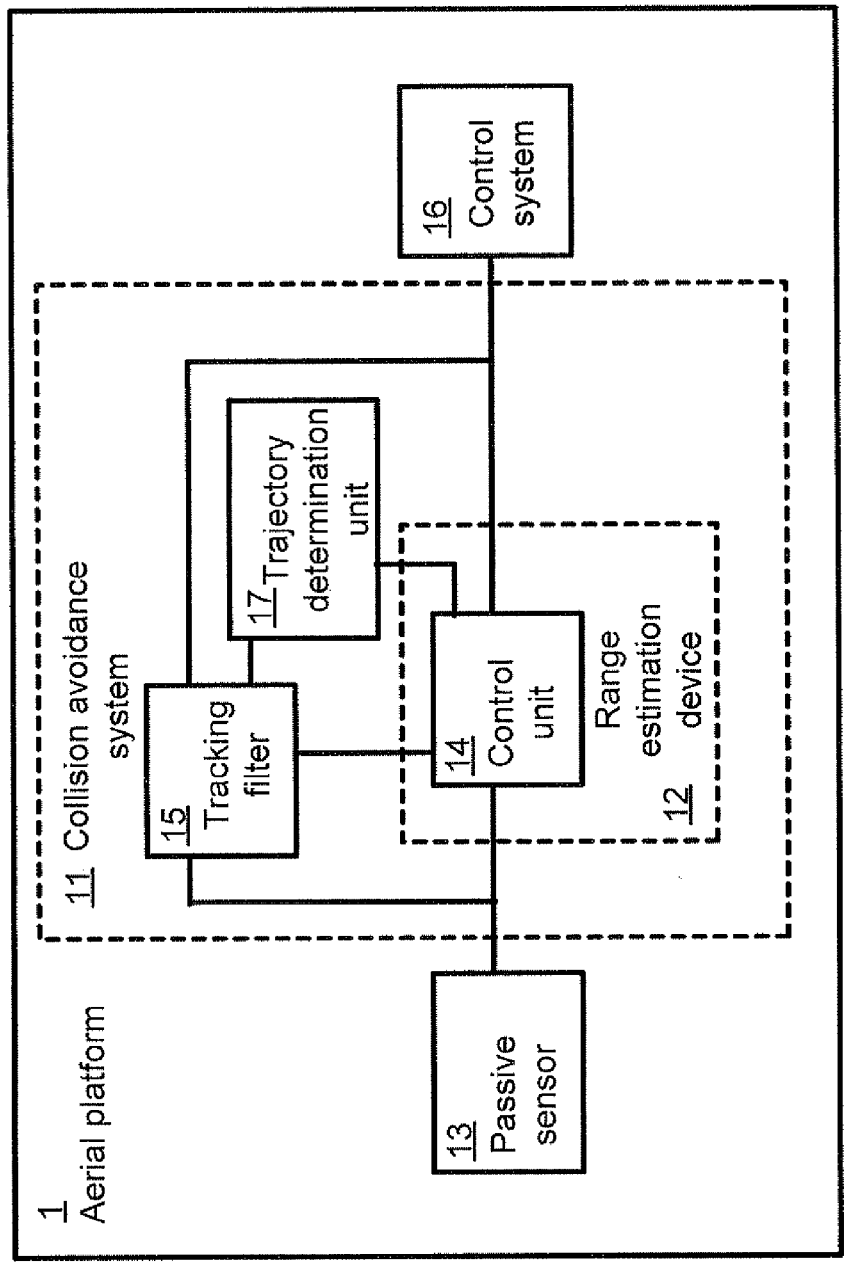

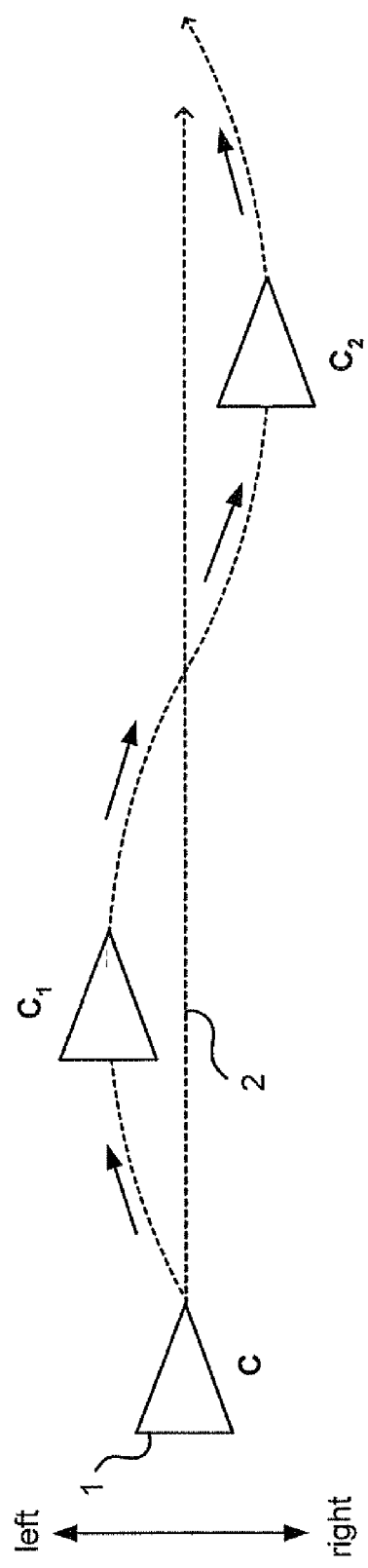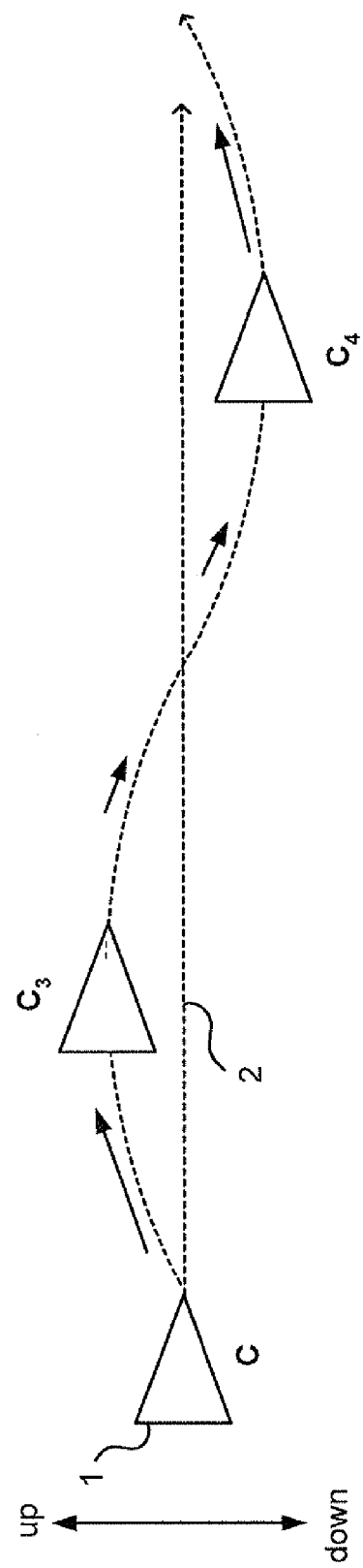

RANGE ESTIMATION DEVICE

CROSS-REFERENCE TO RELATED APPLICATIONS

This application claims priority under 35 U.S.C. §119 to European patent application 08168902.8 is the national phase under 35 U.S.C. §371 of PCT/SE2009/051289 filed 11 Nov. 2009.

TECHNICAL FIELD

The invention relates in general to a range estimation device. The invention also relates to a collision avoidance system and an aerial platform comprising the range estimation device.

The invention further relates to a method for use in a range estimation device, and a computer program product.

BACKGROUND

The available airspace used by both civilian and military aircraft today is getting more and more crowded by each year. As a result, there is an imminent need for onboard automatic systems able to detect possible collision threats and enable the manoeuvring of the aircraft away from such mid-air collision threats. Such onboard automatic systems are generally referred to as collision avoidance systems, and are especially critical for autonomous aircraft, such as, for example, unmanned aerial vehicles (UAVs) where there is no pilot onboard.

Unmanned aerial vehicles (UAVs) depend on its collision avoidance system to detect possible collision threats in order for the system to be able to calculate an optimal escape trajectory, and accordingly manoeuvre the autonomous aerial platform away from the possible collision threat. U.S. Pat. No. 6,510,388 describe a system for avoidance of collision between vehicles. The system may calculate and store a manoeuvre trajectory for a vehicle, which the vehicle is made to follow if a comparison shows that the avoidance manoeuvre trajectory of a vehicle in any moment during its calculated lapse is located at a distance from other vehicles that is smaller than a stipulated minimum distance.

A collision avoidance system may be based on passive sensors mounted on the aircraft, such as, e.g. a video camera. The advantages with using a video camera are numerous, such as, for example, the possibility of achieving high image frame rates, a very high resolution, and a sensitivity that is similar to or better than that of the human eye. By using a passive video camera, it is possible to achieve a tracking of targets which is generally referred to as "bearings-only-tracking". This is because only the bearing of a target is retrievable from the outputs of the passive video camera. From the bearing a "time-to-go"-value, or TGG-value, may be calculated. The TTG-value may inform the collision avoidance system of the minimum time left until the detected target may be reached. The TTG-value may then be used to calculate an escape trajectory. Unfortunately, the result of such calculations is often inaccurate and approximate.

In O. Shakeria, W. Chen and V. M. Raska, "Passive ranging for UAV Sense and Avoid Applications", AIAA-2005-7179-978, the feasibility of estimating a range and velocity of other air traffic by performing a small self-maneuver is investigated.

SUMMARY

A problem to which the invention relates is how to achieve range estimations to a target from passive sensor inputs that are accurate and reliable.

This problem is addressed by a range estimation device for use in an aerial platform comprising at least one passive sensor, a trajectory determination unit and a control system, said range estimation device comprising a control unit arranged to indicate to said control system to perform own-ship manoeuvring of said aerial platform such that the characteristics of passive sensor measurements from said at least one passive sensor enable a range estimation to a target to be determined; characterized by the control unit being further arranged to determine the characteristics of said own-ship manoeuvring based on range uncertainty estimations to said target.

The problem is also addressed by a method for use in a range estimation device in an aerial platform comprising at least one passive sensor, a trajectory determination unit and a control system, wherein said range estimation device comprise a control unit arranged to perform the step of: indicating to said control system to perform own-ship manoeuvring of said aerial platform such that the characteristics of passive sensor measurements from said at least one passive sensor enable a range estimation to a target to be determined; said method being characterized by the step of: determining the characteristics of said own-ship manoeuvring of an aerial platform based on range uncertainty estimations of said range estimation to said target.

The problem is further addressed by a computer program product for use in a range estimation device, wherein said range estimation device comprises computer readable code means, which when run in a control unit in said range estimation device causes said range estimation device to perform the step of: determining the characteristics of own-ship manoeuvring of an aerial platform based on range uncertainty estimations to a target.

By having the aerial platform perform own-ship manoeuvring, the range estimation device may achieve range estimations and associated range uncertainty estimations to a target from the passive sensor inputs. However, by using the range uncertainty estimations to determine the characteristics of the own-ship manoeuvring of the aerial platform, the range estimation device according to the invention is able to provide more accurate and reliable range estimations in, for example, a collision avoidance system. This is because the own-ship manoeuvring will then generate better conditions for determining range estimations.

An advantage of the above described invention is that it by providing more accurate and reliable range estimations and thus more accurate TTG-values, which both subsequently enable computation of both position and velocity of the detected target, significantly improves the determining of a suitable escape trajectory and point in time for activating an avoidance procedure in order to avoid a mid-air collision in a collision avoidance system. This reduces the risk of the aerial platform having to perform a panic manoeuvres.

Another advantage of the above described invention is that it utilizes passive sensors already onboard the aerial platform and used by the collision avoidance system. This achieves a non-expensive solution which does not require costly and heavy additional equipment.

A further advantage of the above described invention is that it may be used as a back-up system in a transponder equipped aerial platform in the case of transponder failure.

The range estimation device may comprise a control unit further arranged to indicate to the control system, if the range uncertainty estimation is above an predetermined acceptance level for the range uncertainty, to perform a continuous idle own-ship manoeuvring of the aerial platform wherein larger sideways and/or climb-sink manoeuvres are performed, wherein said larger sideways and/or climb-sink manoeuvres may be combined with a rolling motion and/or interlaced with a falling turn motion. The larger sideways and/or climb-sink manoeuvres may further be performed using the basic flight lateral and/or longitudinal modes of the aerial platform. These features may provide the advantage of providing accurate and reliable range estimations without having to perform any immediate or sudden own-ship manoeuvring.

Additionally, the range estimation device may comprise a control unit arranged to indicate to the control system, if the range uncertainty estimation is above an predetermined acceptance level for the range uncertainty and if the rate of change of the range uncertainty estimation is below an predetermined acceptable level for the rate of change, that the motion acceleration of said continuous idle own-ship manoeuvring of the aerial platform should be increased. The increase may be indicated by the control unit until the range uncertainty estimation is below the predetermined acceptance level for the range uncertainty; and/or the rate of change of the range uncertainty is above the predetermined acceptable level for the rate of change; and/or a limit value for the motion acceleration of said idle own-ship manoeuvring is reached. This may advantageously provide an easy and simple way to provide accurate and reliable range estimations without having to perform any immediate or sudden own-ship manoeuvring.

Furthermore, the limit value may be the maximum value of the motion acceleration such that the target is still kept in the field of regard (FOR) of the at least one passive sensor, and may also be a function of the limitations of the manoeuvring performance of the control system and the nuisance limitations set by the Air Traffic Control (ATC).

Preferably, the range estimation device may also comprise a control unit arranged to indicate to the control system, if the range uncertainty is above a predetermined acceptance level for the range uncertainty, to perform an own-ship manoeuvring of the aerial platform which produces a significant kinematical acceleration of the aerial platform. This may advantageously provide a way to fast and beneficial way to provide accurate and reliable range estimations.

Preferably, the control unit may further be arranged to indicate to the control system to perform the significant kinematical acceleration of the own-ship manoeuvring such that the target remains within the area covered by the FOR of the at least one passive sensor. This advantageously ensures that a target is not lost from view during the own ship manoeuvring.

Furthermore, the range estimation device may comprise an earth reference own-ship fixed coordinate system, such as, a North-East-Down (NED) coordinate system, which determine an azimuth angle, an elevation angle and a line-of-sight (LOS) vector to the target from the passive sensor measurements, and the control unit may be arranged to indicate to the control system to perform the significant kinematical acceleration of the own-ship manoeuvring substantially in a negative direction of the azimuth and elevation angular change rates, when projected onto a plane which has the LOS vector to the target as a normal, when the target is in a forward facing sector of the FOR of the at least one passive sensor.

Preferably, the range estimation device may comprise a control unit that is further arranged to indicate to the control system to rotate the significant kinematical acceleration of the own-ship manoeuvring such that it is parallel to the upper and lower limits of the FOR of the at least one passive sensor, if the significant kinematical acceleration of the own-ship manoeuvring will cause the target to leave the FOR of the at least one passive sensor. Furthermore, the control unit may be arranged to indicate to the control system to perform the significant kinematical acceleration of the own-ship manoeuvring such that, if the target is at close proximity to the aerial platform, the risk of colliding with the target is not increased.

The problem is also addressed by a collision avoidance system comprising a range estimation device according to the above. The problem is further addressed by an aerial platform comprising range estimation device and/or a collision avoidance system according to the above.

Further advantageous embodiments of the range estimation device, the method, and the computer program product describe further advantageous embodiments of the invention.

BRIEF DESCRIPTION OF THE DRAWINGS

The invention will be described in more detail in the following, with reference to the appended drawings, in which:

FIG. 2 shows a range estimation device according to an exemplary embodiment of the invention.

FIGS. 3a and 3b are flight path illustrations of an aerial platform comprising a range estimation device according to exemplary embodiments of the invention.

DESCRIPTION

Figure 1:
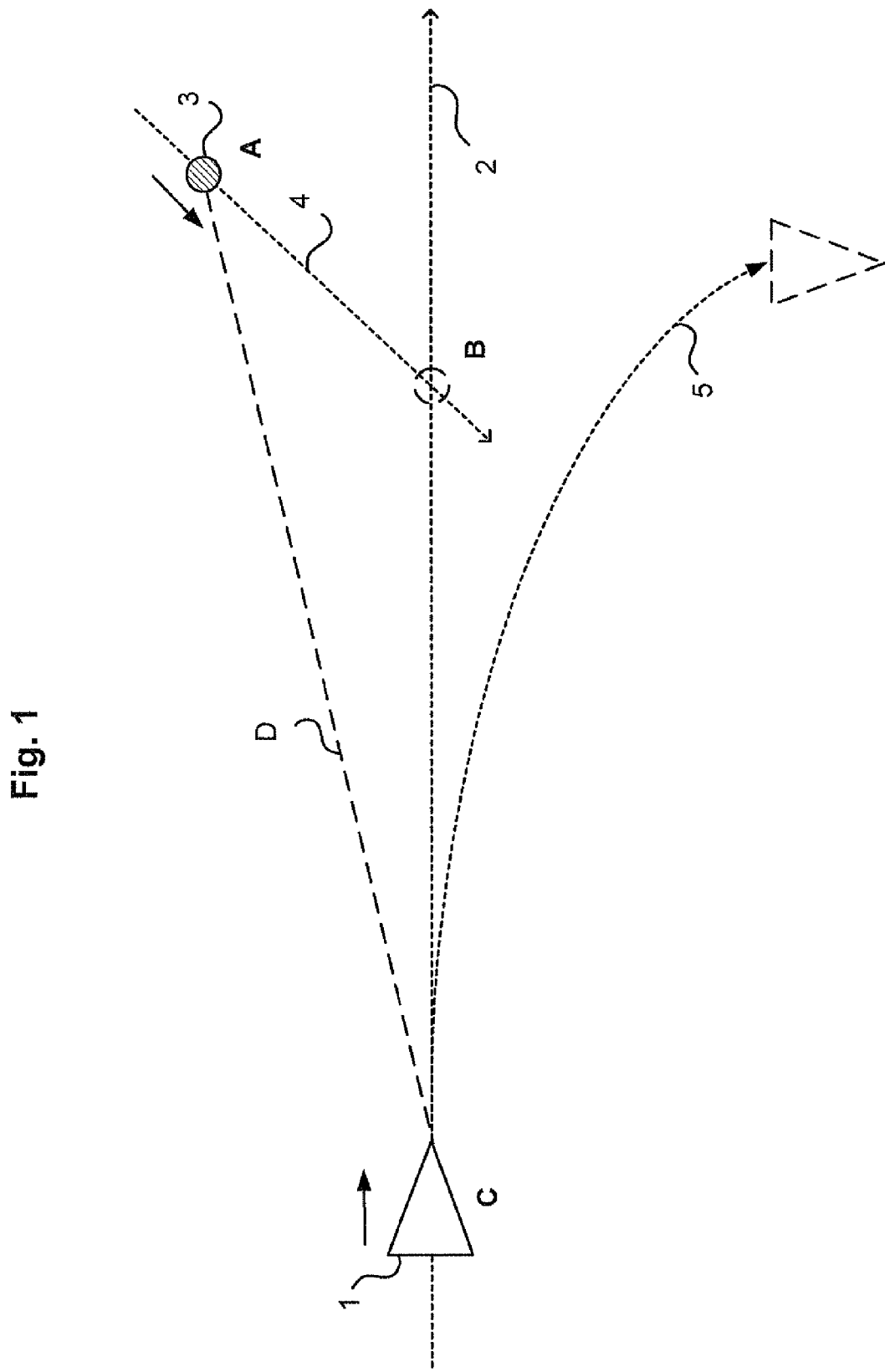
FIG. 1 is an illustration of a mid-air collision avoidance scenario.

FIG. 1 is an illustration of mid-air collision avoidance scenario between an aerial platform 1 and a target 3. The aerial platform 1 is currently travelling along a first trajectory 2 and is in a position C. The target 3 is currently travelling along a second trajectory 4 and is in a position A. The first trajectory 2 of the aerial platform 1 and the second trajectory 4 of the target 3 intersect at a position B. The aerial platform 1 may, for example, be a manned or unmanned aerial vehicle (UAV).

With reference to FIG. 2, a collision avoidance system 11 in the aerial platform 1 is arranged to detect and track the target 3 by using inputs from a passive sensor, such as, e.g. a camera, located on the aerial platform 1. From the inputs of the passive sensor, the collision avoidance system is able to achieve a tracking of the detected target 3, which in general is referred to as "bearings-only"-tracking. This is because, in general, only the bearing of the detected target 3 is retrievable from the outputs of the passive sensor. The term "bearing" is here to be understood as comprising both the azimuth and elevation in respect to the detected target 3. The azimuth and elevation may be determined in view of an earth reference own-ship fixed coordinate system, such as, for example, a North-East-Down (NED) coordinate system. The NED coordinate system may determine the azimuth angle, the elevation angle and a line-of-sight (LOS) vector to the detected target 3 (see FIG. 7). However, from the bearing, the collision avoidance system 11 may calculate an entity referred to as "time-to-go", or TTG. The TTG-value is defined as the range/closure speed and may be calculated using the quotient between the bearing rate of change and the bearing acceleration. It may also be calculated using well established tracking and estimation techniques, such as, for example, extended Kalman filters, unscented Kalman filters or particle filters.

As the bearing rate of change over time is close to zero, there may be a risk of a collision with the detected target 3, whereby the TTG-value may be an estimation of the time left to the possible collision. In this way, the TTG-value may be used by the collision avoidance system 11 in order to determine the time left until a possible collision with a detected target. The TTG-value may then be used in order to calculate an escape trajectory 5 in order to avoid a possible collision with the detected target 3 at position B. However, a problem with the collision avoidance systems using passive sensors according to the prior art is that the result of these calculations described above is often inaccurate and approximate. This may lead to, for example, unnecessary long escape trajectories being performed prematurely by these collision avoidance systems.

Another general problem with collision avoidance systems using passive sensors according to the prior art is that they suffer from a lack of range information, but it is also known that this range information may be obtained by having the aerial platform perform a small self-maneuver. This is commonly referred to as passive ranging. However, there is still a problem with how to achieve range estimations to targets from passive sensor inputs that are accurate and reliable. This may be very important when, for example, determining an escape trajectory in order to avoid a mid-air collision in an aerial platform.

The invention addresses the problems discussed above by providing a range estimation device which determines the characteristics of an own-ship manoeuvring of an aerial platform based on range uncertainty estimations to a target. This enables more accurate and reliable range estimations to be achieved in a shorter period of time as compared to conventional systems.

FIG. 2 shows a range estimation device 12 according to an exemplary embodiment of the invention implemented in a collision avoidance system 11 in an aerial platform 1. The aerial platform 1 further comprises at least one passive sensor 13, a control system 16 and a trajectory determination unit 17. The trajectory determination unit 17 may be characterized as being any system with the ability to provide an accurate position estimate of the aerial platform 1 at several points in time, and may be, for example, an Inertial Navigation System, a Global Positioning Sensor system or the like.

The at least one passive sensor 13 may be a camera, an IR-camera or the like. The at least one passive sensor 13 is preferably located in the front of the aerial platform 11, and is arranged to cover a large forward looking area of the aerial platform 11. This is also known as the field of regard (FOR) of the aerial platform 1 (see FIG. 6). A typical FOR or observation window may, for example, be 220°×30°. The at least one passive sensor 13 may be said to form a part of the range estimation 12, the collision avoidance system 11 and/or the aerial platform 1. It may be arranged to provide the range estimation 12, the collision avoidance system 11 and/or the aerial platform 1 with high-resolution video images of the large forward looking area of the aerial platform 11.

The collision avoidance system 11 may be a system capable of detecting and tracking a target from the high-resolution video images received from the at least one passive sensor 12. This may be performed in the collision avoidance system 11 by a tracking filter 15, such as, for example, an extended Kalman filter, an unscented Kalman filter, a particle filter or the like. The collision avoidance system 13 may be arranged to calculate an optimal escape trajectory for avoiding a collision with a detected target 3. It may further transmit information about the optimal escape trajectory to the control system 16. According to the exemplary embodiment shown in FIG. 2, the tracking filter 15 in the collision avoidance system 11 may be arranged to provide the control unit 14 in the range estimation device 12 with range estimations and range uncertainty estimations, as described further below.

The tracking filter 15 in the collision avoidance system 11 may be arranged to calculate range estimations and range uncertainty estimations to a target 3. The collision avoidance system 11 may then use said range estimations and range uncertainty estimations in the calculations of an optimal escape trajectory. As an simple and illustrative example, the range estimations may be performed by the tracking filter in the collision avoidance system 11 by first calculating the difference between the position of a target 3 in a first video image at a first location of the aerial platform 1 along the flight path determined by an own-ship manoeuvring, and the position of the target in a second video image at a second location of the aerial platform 1 along said flight path determined by said own-ship manoeuvring. Along with the bearing to the detected target 3 from the first position and the bearing to the target 3 from the second position combined with corresponding information of the acceleration history of the aerial platform 1 derived from position data provided by the trajectory determination unit 17, said calculated positional difference of the target 3 may subsequently be used to estimate a range D to a detected target 3 using known triangulation techniques. These may be calculated using and/or used by the well established tracking and estimation techniques of the tracking filter 15 described above. However, the accuracy and reliability of these range estimations and range uncertainty estimations may be determined by the range estimation device 12, as will be described in more detail in the following.

It should also be noted that when calculating an optimal escape trajectory, the collision avoidance system 11 may also consider large variety of flight restrictions and limitations of the aerial platform 1, such as, for example, the manoeuvring capabilities of the aerial platform 1 (e.g. roll-rates, sustainable G-forces, etc.), the field of view of the passive sensor 13, ground collision avoidance, mission objectives, ATC nuisance limitations, etc. The collision avoidance system 11 may also be arranged to use the bearing of a target, the bearing rate of change, the TTG-value and other parameters of the estimated target state in the calculations of an optimal escape trajectory.

The control system 16 controls the flight of the aerial platform 1. The control system 16 may be arranged to receive information from the collision avoidance system 11 indicating an optimal escape trajectory in order to avoid a mid-air collision with a detected target 3. The control system 14 is then arranged to control the flight of the aerial platform 11 according to the received optimal escape trajectory.

Furthermore, the control system 14 may be arranged to receive information from a range estimation device 12 indicating to the control system 14 to perform own-ship manoeuvring. Upon receiving the information from the range estimation device 12 to perform the own-ship manoeuvring, the control system 14 may be arranged to control the flight of the aerial platform 11 according to the own-ship manoeuvring. Information about how to perform the own-ship manoeuvring may be comprised in the own-ship manoeuvring information received from the range estimation device 12. Alternatively, the control system 16 may comprise a set of different own-ship manoeuvres, whereby the own-ship manoeuvring information received from the range estimation device 12 may indicate a selected own-ship manoeuvring to be executed by the control system 16.

Although the range estimation device 12 according to the invention is shown in FIG. 1 as forming a part of the collision avoidance system 11, it is to be understood that the range estimation device 12 may also be a stand-alone and separate unit. The range estimation device 12 may comprise a control unit 14. The control unit 14 may be connected to and arranged to communicate with the at least one passive sensor 13 and the control system 16. The control unit 14 comprises logic for performing the functionality of the range estimation device 12. This functionality may be implemented by means of a software or computer program. The control unit 14 may also comprise storage means or a memory unit for storing the computer program, and processing means or a processing unit, such as a microprocessor, for executing the computer program. When, in the following, it is described that the range estimation device 12 performs a certain function it is to be understood that the control unit 14 may use the processing means to execute a certain part of the program which is stored in the storage means in order to perform said function.

The range estimation device 12 may be arranged to receive passive sensor measurements from the at least one passive sensor 13. Upon detecting a target 3 using the passive sensor measurements, the range estimation device 12 may indicate to the control system 16 to perform own-ship manoeuvring of the aerial platform 1. The own-ship manoeuvring being such that the characteristics of the passive sensor measurements enable a range estimation and range uncertainty estimation to the target 3 to be determined. These range estimations and range uncertainty estimations may be determined by the tracking filter 15 in the collision avoidance system 11, which may be implemented, for example, in the control unit 14 in the range estimation device 12 or in a separate unit as shown in FIG. 2. Thus, the range estimation device 12 can also be said to be arranged to determine range estimations and range uncertainty estimations to the target 3 using these passive sensor measurements.

The range estimation device 12 may, according to the inventive features of the invention, be arranged to provide accurate and reliable range estimations by determining the characteristics of the own-ship manoeuvring based on the range uncertainty estimations to the target 3. This may be performed by the range estimation device 12 by indicating to the control system 16 to perform the own-ship manoeuvring according to these characteristics.

According to a first aspect of the invention, the range estimation device 12 may indicate to the control system 16 to perform a continuous idle own-ship manoeuvring of the aerial platform 1 as described below.

By performing this continuous idle own-ship manoeuvring as a target 3 has been detected, the range estimation device 12 is able to determine if additional own-ship manoeuvring should be performed in order for accurate and reliable range estimations to be provided, or if accurate and reliable range estimations already is provided through the continuous idle own-ship manoeuvring. This may be determined by the range estimation device 12 by checking the range uncertainty and the rate of change of the range uncertainty that is estimated while performing the continuous idle own-ship manoeuvring.

If the range uncertainty is very high and the rate of change of the range uncertainty is too small, then additional own-ship manoeuvring may be performed. The additional own-ship manoeuvring may then continue until good range estimations are achieved, that is, for example, the range uncertainty is below an acceptable level. This additional own-ship manoeuvring may, for example, be the exemplary own-ship manoeuvring described in following. The range estimation device 12 may then return to performing the continuous idle own-ship manoeuvring.

The continuous idle own-ship manoeuvring may also be performed before any target has been detected by the tracking filter 15 in the collision avoidance system 11. This may facilitate more efficient idle own-ship manoeuvring, since it enables the range estimation device 12 to faster determine if the range uncertainty and/or the rate of change of the range uncertainty are below an acceptable level or an acceptable rate of change level, when a target is subsequently detected.

The flight paths shown in FIG. 3a-3b describes exemplary characteristics of the continuous idle own-ship manoeuvring that the range estimation device 12 may indicate to the control system 16, such that the control system 16 advantageously may control the flight of the aerial platform 1 in order to enable the range estimation device 12, or the tracking filter 15 in the collision avoidance system 11, to provide accurate and reliable range estimations to a detected target 3.

According to the exemplary continuous idle own-ship manoeuvring in FIG. 3a-3b, the control system 16 of the aerial platform 1 may perform a larger sideways and/or climb-sink manoeuvre from the current position C to a first position $C_1$ and then from the first position $C_1$ to a second position $C_2$. The sideways and/or climb-sink manoeuvre $C$-$C_1$-$C_2$ may also be combined with a rolling motion, and also be interlaced with a falling turn motion.

In order to achieve the exemplary continuous idle own-ship manoeuvring as shown in FIG. 3a-3b, the control system 16 of the aerial platform 1 may utilize the basic flight dynamic lateral and/or longitudinal modes of the aerial platform. A phugoid movement is, for example, an aerial motion where the aerial platform 1 speeds up and subsequently climbs, and then slows down and subsequently descends. The speed of the aerial platform 1 changes during the maneuver (as indicated by the longer and shorter arrows in FIG. 3b, respectively). This is illustrated by the exemplary continuous idle own-ship manoeuvring in FIG. 3b as the control system 16 of the aerial platform 1 manoeuvres the aerial platform 1 from the current position C to a third position $C_3$ and then from the third position $C_3$ to a fourth position $C_4$. The phugoid movement is one of the basic longitudinal flight dynamics modes of an aerial platform 1. Alternatively, according to another mode of an aerial platform 1 is the short-term longitudinal mode with the characteristics of pitching oscillations which entails an oscillatory motion in altitude. It has the same appearance in FIG. 3b as the phugoid mode, but is generally shorter and entails less variation in the speed of the aerial platform 1. This mode may be used similarly as the phugoid mode for a longitudinal own ship manoeuvre with a shorter time period. Furthermore and according to yet another mode of the aerial platform 1 is the Dutch-Roll mode which has the characteristics of a coupled rolling and pitching motion. This mode may similarly be used to produce an own ship manoeuvre which combines the motions of FIG. 3a-3b. The natural modes are conventionally regarded as an undesired, but a natural movement of the aerial platform 1. Thus, they are therefore often filtered out by the control system 16 of the aerial platform 1.

Figure 4:
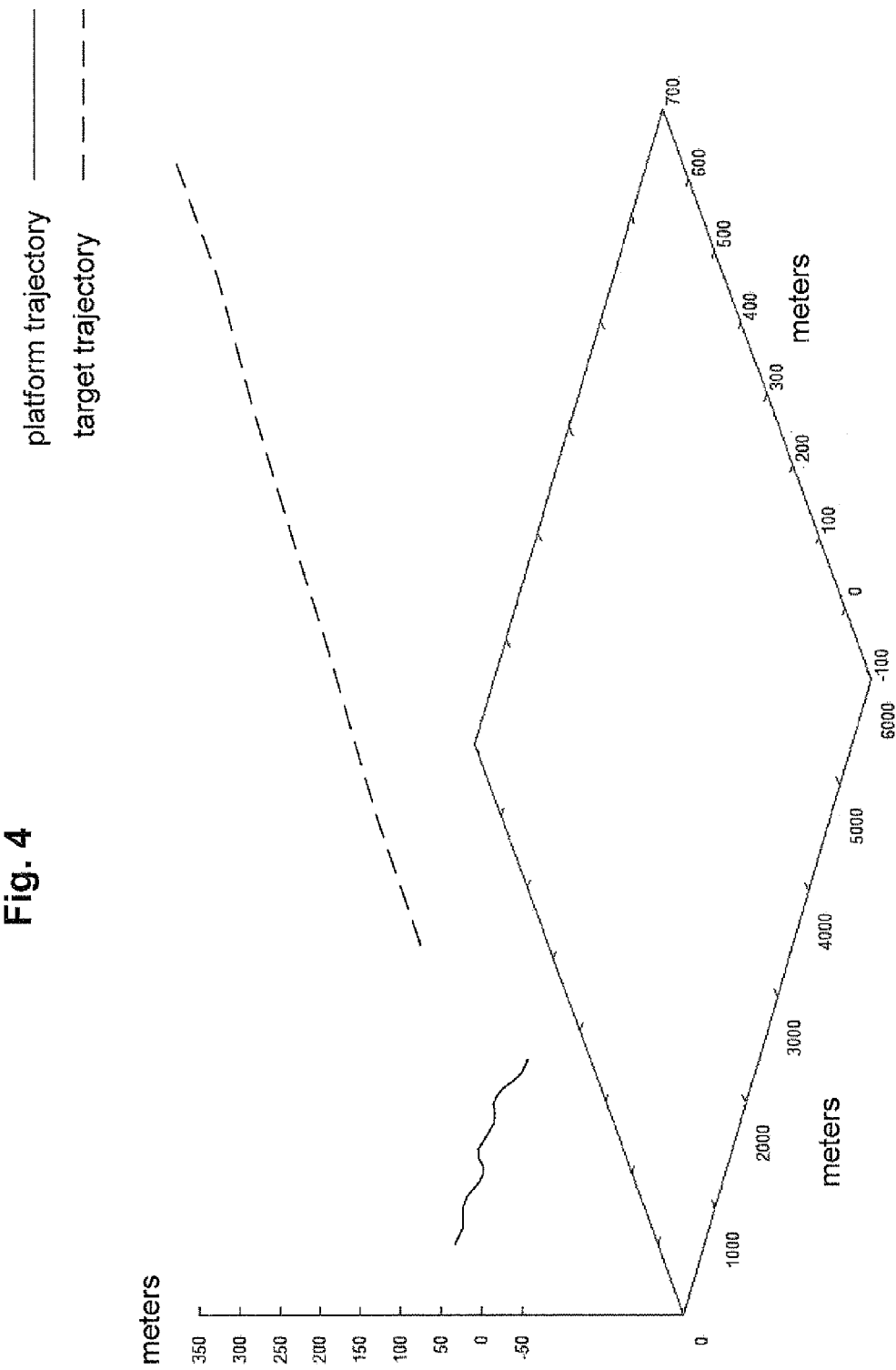
FIG. 4 is an illustration of a simulation of an aerial platform comprising a range estimation device according to an exemplary embodiment of the invention.

FIG. 4 illustrates a simulation of an aerial platform 1 comprising a range estimation device 12 according to an exemplary embodiment of the invention described above. In FIG. 4, the unbroken line describes the trajectory of the aerial platform 1, and the dashed line describes the trajectory of a target 3. As the aerial platform 1 performs idle own-ship manoeuvring according to, for example, the continuous idle own-ship manoeuvring described above with reference to FIG. 3a-3b, accurate and reliable range estimations may be achieved, as shown in reference to FIG. 5.

Figure 5:
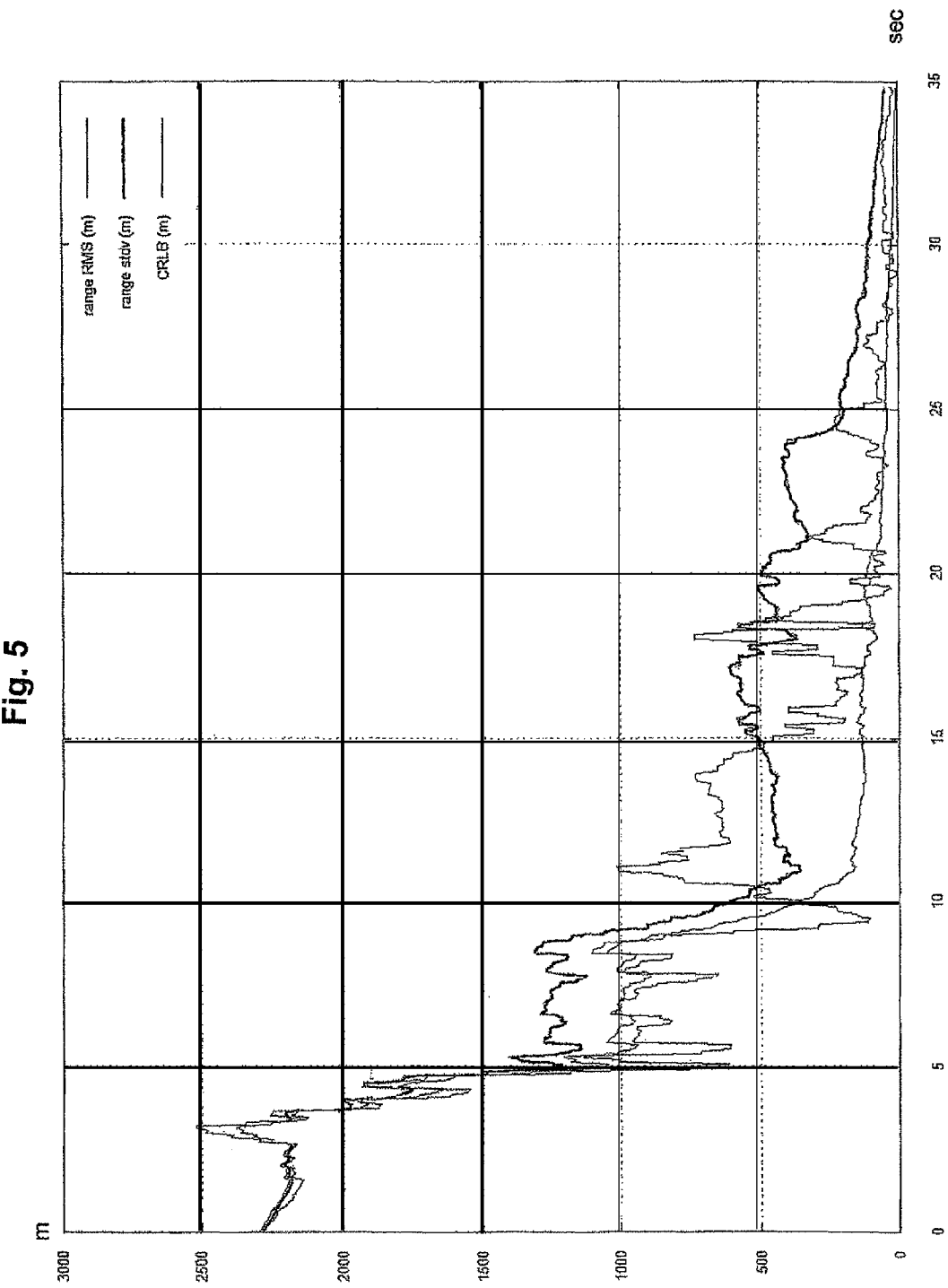
FIG. 5 is a simulation diagram of measurements obtained in the simulation in FIG. 4.

FIG. 5 is a simulation diagram of measurements obtained in the simulation according to FIG. 4. The simulation diagram in FIG. 4 describes three different exemplary measurements which may be provided by the tracking filter 15 in the collision avoidance system 11 (in this case, a Kalman filter): the root mean square error of the range estimation (range RMS) of the Kalman filter; the standard deviation of the range estimation of the Kalman filter (range stdv); and a parametric Cramer-Rao Lower Bound error (CRLB), which describes the least possible theoretical error.

An important aspect of the invention is that by performing continuous idle own-ship manoeuvring and monitoring the range uncertainty and the rate of change of the range uncertainty, the control unit 14 in the range estimation device 12 enables a determination of how well the range and range uncertainty of the tracking filter 15 in the collision avoidance system 11 corresponds to the true range to the target 3. As seen in the simulation diagram in FIG. 5, the range RMS, the range stdv and the CRLB all decreases over time, whereby it is reasonable to believe that the range estimation of the Kalman filter in the tracking filter 15 corresponds fairly well to the true range to the target 3. As these measurements reaches below an acceptable level, it ensures that accurate and reliable range estimations are performed by the tracking filter 15 in the collision avoidance system 11, and will also ensure better estimations of, for example, the TTG-value, and thereby also improve the estimations of the position and speed of the target 3.

According to another aspect of the invention, a different own-ship manoeuvring may also be performed by the range estimation device 12, either independently or in addition to the continuous idle own-ship manoeuvring described in the embodiment above.

The range estimation device 12 may perform this own-ship manoeuvring, which is described below, by accentuating the idle own-ship manoeuvring above upon detecting a target 3. This may be performed in order to facilitate a faster and more efficient idle own-ship manoeuvring, since it enables the rate of change of the range uncertainty to reach the acceptable rate of change level within a shorter period of time when a target 3 has been detected.

The range estimation device 12 may check the rate of change of the range uncertainty in order to determine if the control system 16 should increase e.g. the motion acceleration of the own-ship manoeuvring. If the rate of change of the range uncertainty is too small, then the motion acceleration may preferably be increased. This may continue until accurate and reliable range estimations are achieved, that is, for example, when the rate of change of the range uncertainty estimations is above an acceptable rate of change level. An example of how the range uncertainty estimations may vary over time is shown in the simulations described in reference to FIGS. 3 and 4.

The increase may also continue to be made until a limiting value of e.g. the motion acceleration has been reached. This limiting value may be a function of the previously mentioned large variety of flight restrictions and limitations of the aerial platform 11, such as, for example, the manoeuvring capabilities of the aerial platform 11 (e.g. roll-rates, sustainable G-forces, etc.), the field of regard (FOR) of the passive sensor 12, ground collision avoidance, mission objectives, or nuisance limitations set by the ATC (Air Traffic Control), etc.

This type of own-ship manoeuvring may advantageously maximize the motion acceleration of an aerial platform 1 with a limited manoeuvrability, such that the range estimation device 12 to in a short period of time may cause the tracking filter 15 in the collision avoidance system 11 to achieve accurate and reliable range estimations of the range D to the detected target 3. From the improved estimate of range D and the measured bearing and bearing rate of change of the target 3 follows an improved estimate of the velocity of the target 3.

According to a further aspect of the invention, another different own-ship manoeuvring may also be performed by the range estimation device 12, either independently or in addition to the different own-ship manoeuvring described in the embodiment above and/or in addition to the continuous idle own-ship manoeuvring described in reference to FIGS. 3-5.

The range estimation device 12 may perform this own-ship manoeuvring which is described below in order to, in dependence of a specific situation, achieve a significant acceleration creating manoeuvre. This may be performed such that accurate and reliable range estimations to a detected target 3 may be obtained in a fast and safe manner.

According to this aspect of the invention, the range estimation device 12 is arranged to perform this significant acceleration creating manoeuvre according to the own-ship manoeuvring in such a manner that the detected target 3 remains within the area covered by the field of regard (FOR) of the at least one passive sensor 13. An exemplary own-ship manoeuvring scheme of how this may be achieved is described in the following with reference to FIGS. 8a-b, 9 and 10a-e.

Figure 6:
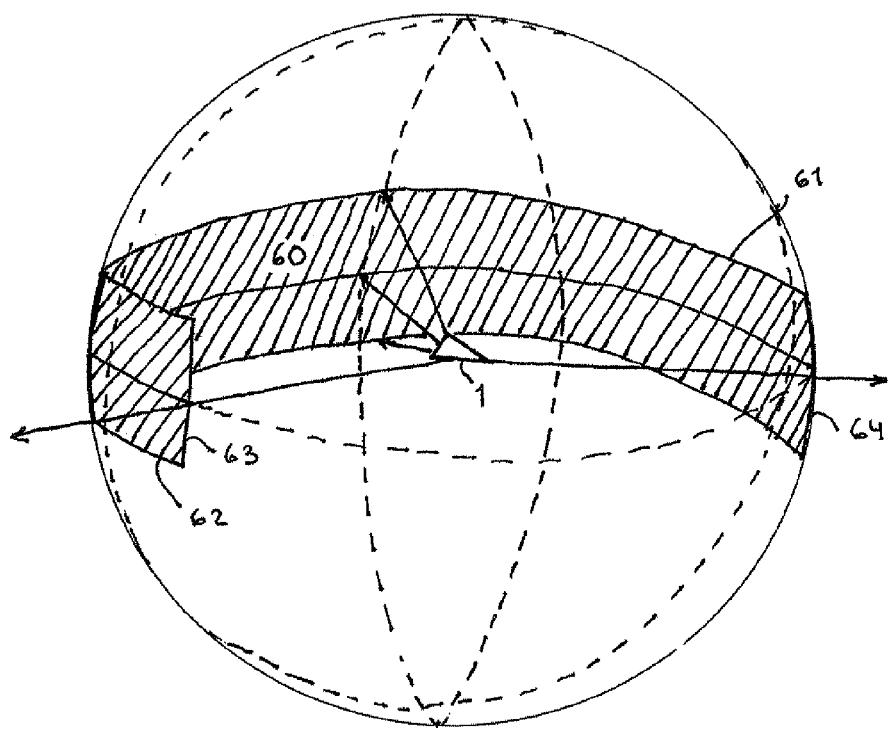
FIG. 6 is an exemplary illustration of the field-of-regard of an aerial platform.

FIG. 6 shows an illustrative example of a field of regard (FOR) 60. In FIG. 6, the FOR 60 of the aerial platform 1 comprises an upper limit 61, a lower limit 62, a port limit 63 and a starboard limit 64. The FOR 60 limits may be described in other ways and its shape may take other forms than that of a rectangle in the view plane 85 described below. A general FOR may therefore be described as forming one or more closed curves that do not intersect themselves in the view plane 85, whereby the form of the FOR 60 described herein should not be construed as limiting to the invention.

Figure 7:
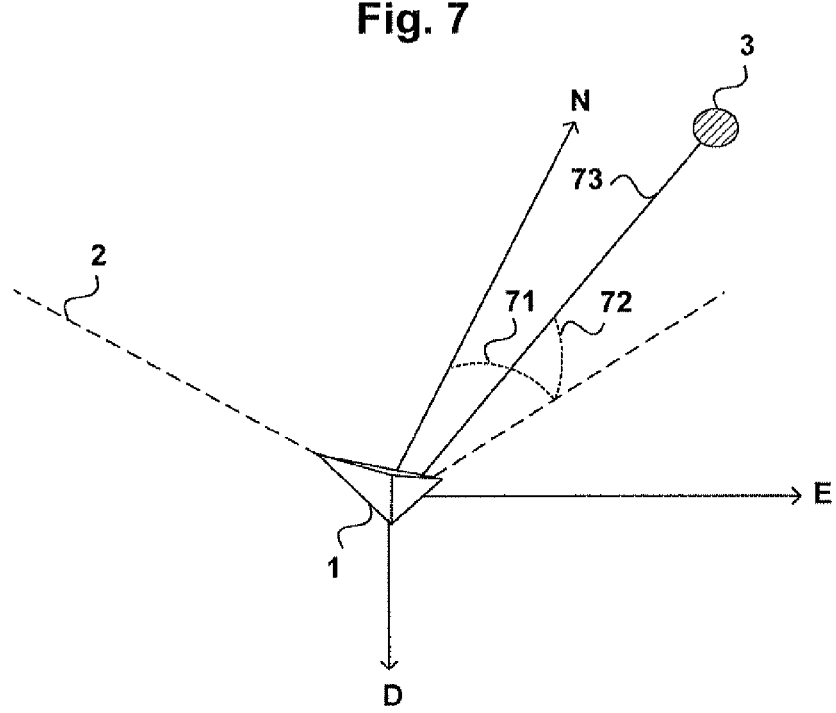
FIG. 7 is an exemplary illustration of a North-East-Down coordinate system.

FIG. 7 shows an illustrative example of a North-East-Down [NED] coordinate system as seen from the aerial platform 1. The exemplary North-East-Down [NED] coordinate system in FIG. 7 may determine an azimuth angle 71, an elevation angle 72 and a line-of-sight (LOS) vector 73 to the detected target 3. The exemplary own-ship manoeuvring scheme may be described with reference to the North-East-Down [NED] coordinate system which, as mentioned in the above, may be comprised in the collision avoidance system 11 in the aerial platform 1.

Figure 8A:
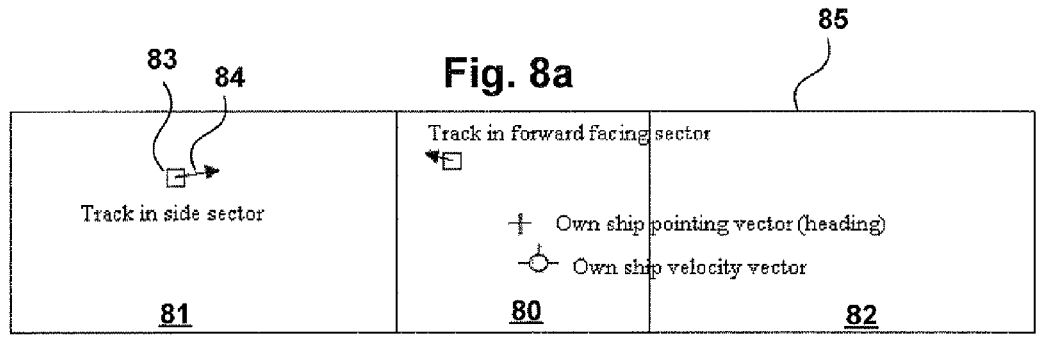
FIGS. 8a-b are exemplary illustrations of a two-dimensional view plane of an aerial platform.
Figure 8B:
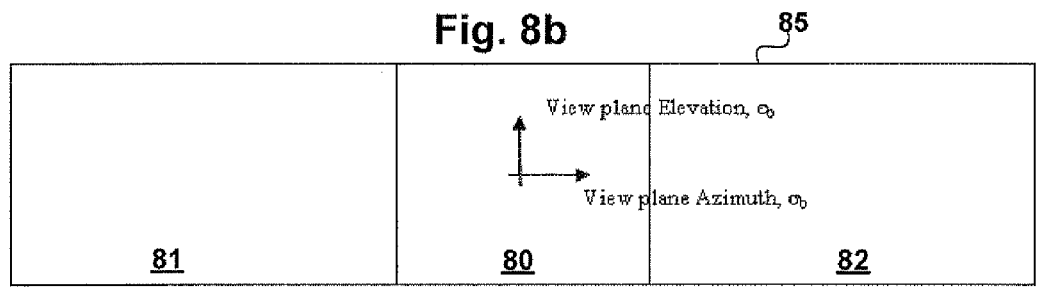

FIGS. 8a-b illustrates a projection of the view from the aerial platform 1, i.e. the area covered by the FOR 60 of the at least one passive sensor 13, onto a two-dimensional plane 85. As can be seen in FIGS. 8a-b, the two-dimensional view plane 85 may be divided into one forward facing sector 80, a left side sector 81 and a right side sector 82.

FIG. 8a shows an exemplary fictive situation to illustrate how targets, also referred to as tracks when appearing in the FOR 60, are seen by the aerial platform 1. A track 83 is shown in the left side sector 81, wherein the arrow 84 denotes the line-of-sight (LOS) rotation of the track 83. Another track is also shown in the forward facing sector 80 of the two-dimensional view plane 85. Also shown for illustrative purposes in the FOR 60 is an own-ship pointing vector describing the heading of the aerial platform 1, and an own-ship velocity vector describing the velocity of the aerial platform 1.

FIG. 8b shows a definition of the two-dimensional view plane 85 coordinate system which defines a view plane elevation angle, $\epsilon_b$, and a view plane azimuth angle, $\sigma_b$. Note that the view plane elevation angle, $\epsilon_b$, and the view plane azimuth angle, $\sigma_b$, are generally different from those given by the North-East-Down [NED] coordinate system.

For a target located in the forward facing sector 80, an own-ship manoeuvring scheme that describes how the aerial platform 1 may perform in respect to such targets are described below. First, a limit may be set for the azimuth angular rate of change and the elevation rate of change of the target 3 above which no own-ship manoeuvring needs to be performed. This angular rate limit may be set by considering, for example, which angular rates are guaranteed to result in a non-collision between the aerial platform 1 and the target 3 in view of the minimum estimated range to the target 3. The angular rate limit may also be set by considering other physical or operational considerations.

Secondly, the own-ship manoeuvring may be determined such that the motion acceleration of the own-ship manoeuvring is in a negative direction of the azimuth and elevation angular change rate, when projected onto a plane which has the LOS vector as a normal. However, an exception maybe made if the determined motion acceleration of the own-ship manoeuvring will cause the target 3 to leave the FOR 60 of the at least one passive sensor 13. In this case, the control unit 14 in the range estimation device 12 may rotate the previously determined motion acceleration of the own-ship manoeuvring such that a new own-ship manoeuvring is determined, which is parallel to the upper 61 and lower limits 62 of the FOR 60 of the at least one passive sensor 13. This will cause a maximum shift of 90° of the own-ship manoeuvring.

The own-ship manoeuvring scheme described above may preferably be implemented for a limited forward facing sector 80 of the total FOR 60 of the at least one passive sensor 13. The definition of the forward facing sector 80 of the FOR 60 is dependent upon the manoeuvrability of the aerial platform 1 and the actual size of the FOR 60 of the at least one passive sensor 13. Typically, the forward facing section 80 is as wide as the FOR 60 is high, that is, the length between the upper 61 and lower 62 limits of the FOR 60 of the at least one passive sensor 13.

For a target located outside the forward facing sector 80 it is more likely that the target is lost during the own-ship manoeuvring, and the choice of own-ship manoeuvres is more restricted. An own-ship manoeuvring scheme that describes how the aerial platform 1 may perform in respect to targets 3 in the side sectors 81, 82 is described below.

First, a limit may be set for the azimuth angular rate of change and the elevation angular rate of change of the target 3 above which no own-ship manoeuvring needs to be performed. This is done similarly for the above case where the target is located in the forward facing sector 80. The limits used may differ from said exemplary case.

Secondly, one possible own-ship manoeuvring scheme or algorithm(s) is to use a combination of normal load and roll to keep the track (i.e. target) in the FOR 60. Either a pull-up or a bunt maneuver may be used. Maximum allowed normal load variation is used. To keep the apparent elevation of the track in the FOR 60 window constant (i.e. prevent the track from leaving the FOR 60 in the vertical) the roll rate (p) is set dependent on pitch rate (q) and target relative location as shown in Eq. 1:

$$p = q \cos(\sigma_b)/\sin(\sigma_b) \quad \text{(Eq. 1)}$$

(Note that this algorithm has a singularity in the forward facing section of the FOR 60).

Also there may be a need to compensate for the change of elevation in the FOR 60 that is caused by the necessary angle of attack ($\alpha$) change required to produce the normal load ($n_z$) required. This is calculated as a delta roll angle Dp (integral of p) to be added during the load build up phase of the maneuver. This is calculated as shown in Eq. 2:

$$Dp = d\alpha/dn_z \cos(\sigma_b)/\sin(\sigma_b) Dn_z \quad \text{(Eq. 2)}$$

$d\alpha/dn_z$ is the instantaneous increase in angle of attack for per change in normal load of the aircraft. It is given by the aircraft characteristics and current calibrated air-speed. $Dn_z$ is the difference between the current (pre-maneuver) normal load of the aerial platform 1 to the normal load commanded during the maneuver. To decide whether a pull-up or bunt maneuver should be executed, the expected resulting kinematic acceleration vector, projected onto a plane with the LOS as its normal vector, of the aerial platform 1 is evaluated for both cases. In addition to the algorithms above, a feedback control loop may also be added using commanded p to center the track close to $\epsilon_b = 0$ over time.

Figure 9:
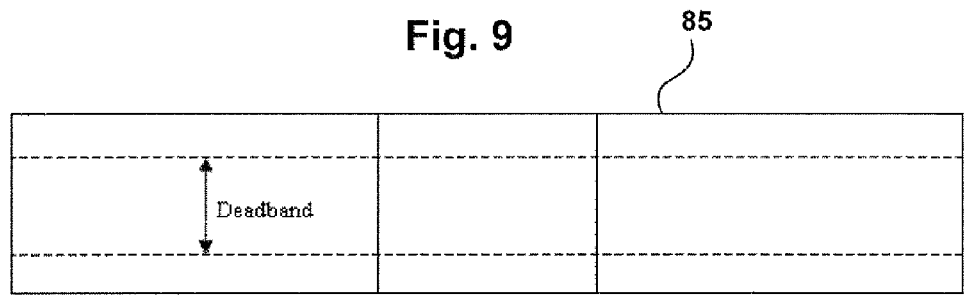
FIG. 9 illustrates a dead band in a two-dimensional view plane of an aerial platform.

The feedback control loop may additionally be constructed to allow a dead band in the middle of the FOR 60 to remove unnecessary maneuvering while the target is in the deadband of the FOR 60. An example of such a dead band in the two-dimensional view plane 85 is shown in FIG. 9. When the target is outside the dead band the feedback control would be activated, and a higher gain could also be used.

The feedback gain of both above implementations may be of the form shown in Eq. 3:

$$Dp_{err} = -\cos(\sigma_b) * \epsilon_b \text{ or } p_{err} = -\cos(\sigma_b) \text{sign}(\epsilon_b) \max(0, |\epsilon_b - \epsilon_{b,deadband}|) \quad \text{(Eq. 3)}$$

where $\epsilon_{b,deadband}$ is (half) of the desired deadband. $Dp_{err}$ is then used as input to any suitable control algorithm.

The algorithms above may furthermore be extended to prevent the track from leaving the FOR 60 in the horizontal ($|\sigma_b|$>FOR sigma limit). This may however produce a conflict with the argument not to maneuver to collision.

For maneuvering versus targets in both forward facing sector 80 and side facing sectors 81, 82, a right hand turn is used if the LOS angular rate is so low a direction cannot be determined. This is in accordance ICAO Right-of-Way rules. For cases in the side facing sectors 81, 82, the previous formulae is used in reverse to determine if a right hand turn equates to a pull-up or bunt maneuver (Eq. 4).

$$q = p \sin(\sigma_b)/\cos(\sigma_b) \quad \text{(Eq. 4)}$$

Again there is a singularity problem, which now occurs for tracks near the +/−90° points of $\sigma_b$. This is solved by not using roll when $\sigma_b$ becomes close to +/−90°, but instead using a pull up (track $\sigma_b$ near +90°) or bunt (track $\sigma_b$ near −90°). For the same geometric reason we have a singularity, we also do not risk loosing the track to outside of the FOR 60.

FIGS. 10a-e shows illustrative examples of how the own-ship manoeuvring scheme above may perform in five distinct exemplary situations (shown by the large arrow as rates) in a manner such that the detected target 3 remains within the area covered by the FOR 60 of the at least one passive sensor 13.

FIGS. 10a-e shows the two-dimensional view plane 85 comprising the forward facing sector 80, the side sectors 81, 82, and a 90° angle marks (denoted by 101 and/or dashed lines). The position of the discovered track 3 (i.e. detected target) is depicted by a square and its line-of-sight (LOS) rotation is shown as a line from the square. Also, note that FIGS. 10a-e only shows the initial response and that angle of attack change compensation according to Eq. 2 is not included.

Figure 10A:
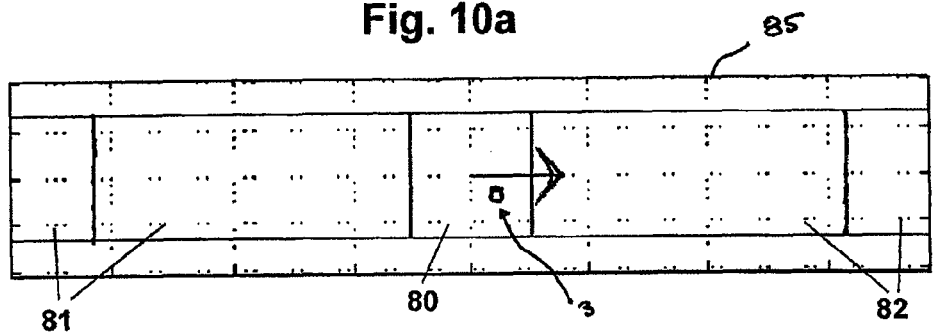
FIG. 10a-e shows illustrative examples of the performance of the invention according to an exemplary embodiment.

FIG. 10a shows a track 3 in the forward facing sector 80 with no LOS rotation. The range estimation device 12 in the aerial platform 1 may then select to perform own-ship manoeuvring comprising the characteristics of a level turn to the right.

Figure 10B:
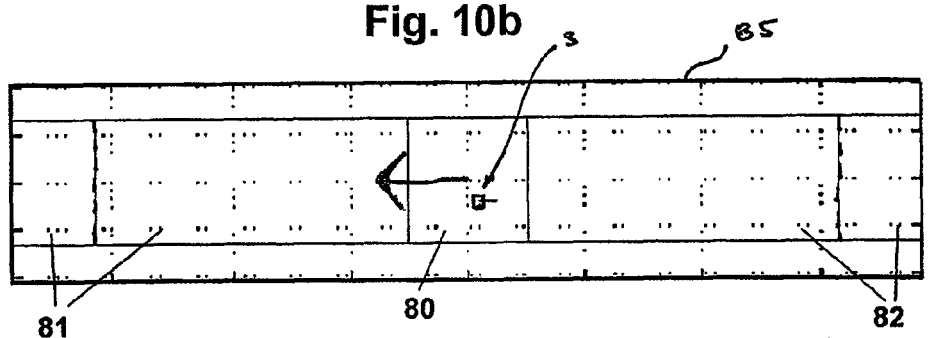

FIG. 10b shows a track 3 in the forward facing sector 80 with LOS rotation rightwards. The aerial platform 1 may then select to perform a turn to the left.

Figure 10C:
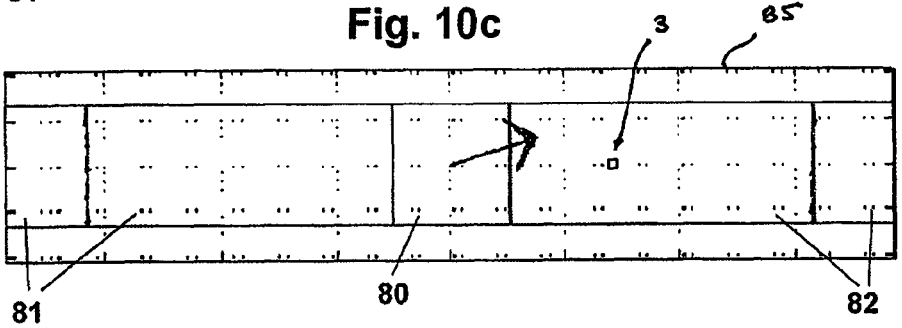

FIG. 10c shows a track 3 in the right side facing sector 82 with no LOS rotation. The range estimation device 12 in the aerial platform 1 may then select to perform own-ship manoeuvring comprising the characteristics of a climbing turn rightward with balance between turning and pitching up.

Figure 10D:
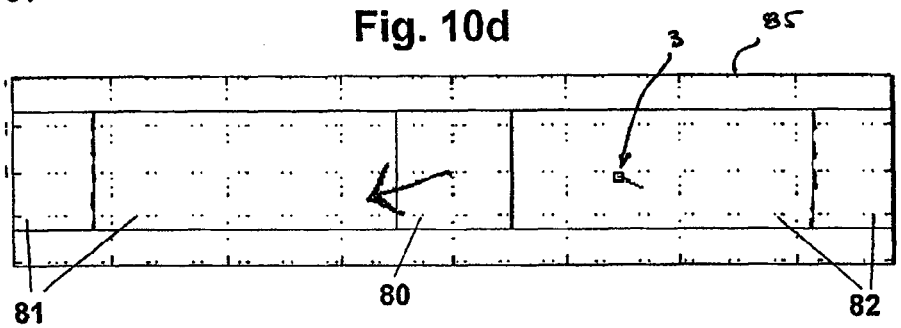

FIG. 10d shows a track 3 in the right side facing sector 82 with a LOS rotation. The range estimation device 12 in the aerial platform 1 may then select to perform own-ship manoeuvring comprising the characteristics of a diving turn to the left to avoid turning in the LOS rotation direction of the track 3.

Figure 10E:
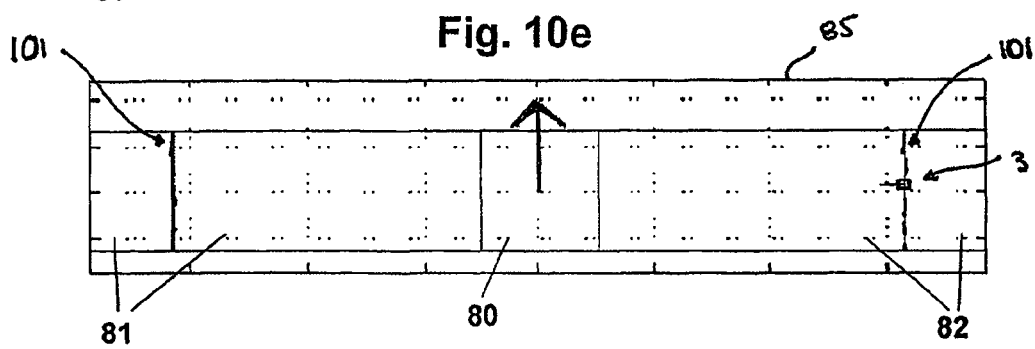

FIG. 10e shows a track 3 on the 90° angle mark 101 to illustrate that the range estimation device 12 in the aerial platform 1 may here select to perform own-ship manoeuvring comprising the characteristics of a pure pull up manoeuvre (or bunt if appropriate with respect to the LOS rotation of the track 3).

It should be noted, in reference to FIGS. 10a-e, that should the optimal acceleration creating manoeuvre of the own-ship manoeuvring not be enough to obtain accurate and reliable range estimations to a detected target 3, the own-ship manoeuvring may further comprise a manoeuvre with the characteristics of a reversed version of said optimal acceleration creating manoeuvre. This own-ship manoeuvring may be performed according to the same constraints as the optimal acceleration creating manoeuvre. Thus, this may enable the range estimation device 12 to obtain accurate and reliable range estimations to a detected target 3.

Figure 11:
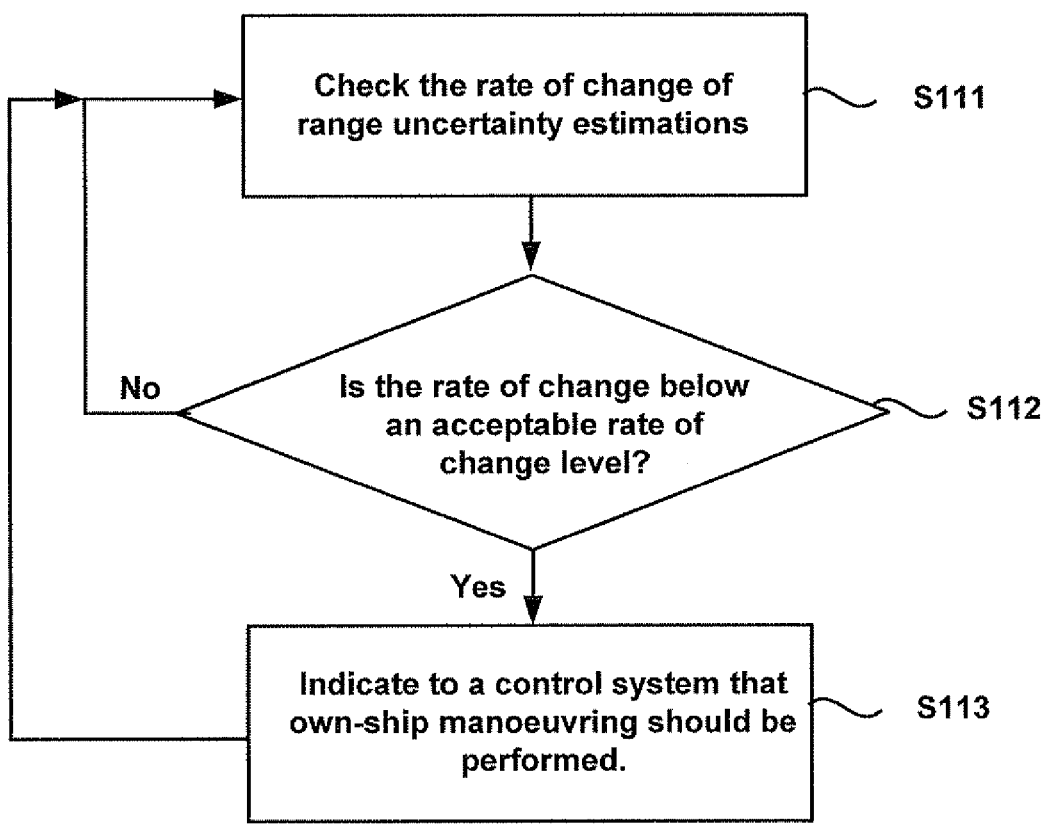
FIG. 11 is a flowchart illustrating a method according to an exemplary embodiment of the invention.

FIG. 11 illustrates a method for use in a range estimation device 12, for performing the own-ship manoeuvring according to an exemplary embodiment of the invention.

In step S111, the range estimation device 12 may check the rate of change of the range uncertainty estimations received from e.g. the tracking filter 15 in the collision avoidance system 15. This may be performed when the control system 16 of the aerial platform 1 has begun performing idle own-ship manoeuvring or other own-ship manoeuvring.

In step S112, if the rate of change of the range uncertainty is above or equal to an acceptable rate of change level, the range estimation 12 may return to step S111. However, if the rate of change of the range uncertainty is below an acceptable rate of change level, the range estimation device 12 may proceed to step S113.

In step S113, the range estimation device 15 may indicate to a control system 16 that own-ship manoeuvring should be performed. The own-ship manoeuvring, being additional and/or idle, may be performed according to any of the embodiments described above in reference to the different aspects of the invention. The range estimation 12 may then return to step S111.

The selection of which own-ship manoeuvring to be used, for example, the idle own-ship manoeuvring C-$C_1$-$C_2$ or C-$C_3$-$C_4$, may depend on the location of the target 3 relative to the aerial platform 1, and be performed in a direction so as to possibly avoid a future collision. If there are several targets then the most immediate threat, i.e. the closest target or that with the lowest TTG-value, may decide which own-ship manoeuvring to be used. Thus, the collision avoidance may be performed in response to that immediate threat.

Of course, other own-ship manoeuvres than the examples described above may also be perceived and anticipated by the invention, although not thoroughly described herein.

The description above is of the best mode presently contemplated for practising the invention. The description is not intended to be taken in a limiting sense, but is made merely for the purpose of describing the general principles of the invention. The scope of the invention should only be ascertained with reference to the issued claims.

The invention claimed is:

1. A range estimation device for use in an aerial platform, the aerial platform comprising at least one passive sensor and a trajectory determination unit, said range estimation device comprising:

a control system configured to generate commands to maneuver the aerial platform; and a control unit arranged to indicate to said control system to perform own-ship maneuvering of said aerial platform such that characteristics of passive sensor measurements from said at least one passive sensor enable a range estimation to a target to be determined, wherein said control unit is further arranged to determine characteristics of said own-ship maneuvering based on range uncertainty estimations to said target, wherein the control system generates commands to perform own-ship maneuvering if the range uncertainty estimations are above a predetermined acceptance level and if an azimuth angular change rate and an elevation angular change rate of the target are below an angular rate limit set in view of a minimum estimated range to the target.

2. The range estimation device according to claim 1, wherein said control unit is arranged to indicate to said control system, if the range uncertainty estimation is above the predetermined acceptance level for the range uncertainty, to perform a continuous own-ship maneuvering of the aerial platform wherein at least one of repeated sideways or climb-sink maneuvers are performed.

3. The range estimation device according to claim 2, wherein said at least one of repeated sideways or climb-sink maneuvers of the continuous own-ship maneuvering of the aerial platform is combined with a rolling motion and/or interlaced with a falling turn motion.

4. The range estimation device according to claim 2, wherein said at least one of repeated sideways or climb-sink maneuvers of the continuous own-ship maneuvering of the aerial platform uses the basic flight lateral and/or longitudinal modes of the aerial platform.

5. The range estimation device according to claim 1, wherein said control unit is arranged to indicate to said control system if the range uncertainty estimation is above the predetermined acceptance level for the range uncertainty and if the rate of change of the range uncertainty estimation is below the predetermined acceptable level for the rate of change, wherein if the range uncertainty estimation is above the predetermined acceptance level and if the rate of change of the range uncertainty estimation is below the predetermined acceptable level, an acceleration of said continuous own-ship maneuvering of the aerial platform is increased.

6. The range estimation device according to claim 5, wherein said increase of the motion acceleration of said own-ship maneuvering is indicated by said control unit until the range uncertainty estimation is below at least one of the predetermined acceptance level for the range uncertainty; or the rate of change of the range uncertainty is above the predetermined acceptable level for the rate of change; or a limit value for the acceleration of said idle own-ship maneuvering is reached.

7. A collision avoidance system, comprising:
   a range estimation device according to claim 1.
8. An aerial platform, comprising:
   a range estimation device according to claim 1.
9. An aerial platform, comprising:
   a collision avoidance system according to claim 7.
10. A method for use in a range estimation device in an aerial platform, the aerial platform comprising at least one passive sensor, a trajectory determination unit and a control system, wherein said range estimation device comprises a control unit arranged to cause said control system to perform own-ship maneuvering of said aerial platform such that characteristics of passive sensor measurements from said at least one passive sensor enable a range estimation to a target to be determined, said method comprising:
   determining the characteristics of said own-ship maneuvering of an aerial platform based on range uncertainty estimations of said range estimation to said target; and
   generating commands with the control system to perform own-ship maneuvering if the range uncertainty estimations are above a predetermined acceptance level and if an azimuth angular change rate and an elevation angular change rate of the target are below an angular rate limit set in view of a minimum estimated range to the target.
11. The method according to claim 10, further comprising:
   if the range uncertainty is above the predetermined acceptance level for the range uncertainty, indicating to said control system to perform a continuous own-ship maneuvering of the aerial platform.
12. The method according to claim 10, further comprising:
   if the range uncertainty is above the predetermined acceptance level for the range uncertainty, and if the rate of change of the range uncertainty is below the predetermined acceptable level for the rate of change, indicating to said control system that an acceleration of said continuous idle own-ship maneuvering of the aerial platform should be increased.
13. The method according to claim 12, further comprising:
   indicating to said control system to increase the acceleration of said idle own-ship maneuvering until:
   at least one of
   the range uncertainty estimation is below the predetermined acceptance level for the range uncertainty;
   the rate of change of the range uncertainty is above the predetermined acceptable level for the rate of change; or
   a limit value for the motion acceleration of said own-ship maneuvering is reached.
14. The method according to claim 10, further comprising:
   if the range uncertainty is above the predetermined acceptance level for the range uncertainty, indicating to said control system to perform a own-ship maneuvering of the aerial platform which produces a kinematical acceleration of the aerial platform.
15. The method according to claim 14, further comprising:
   performing said kinematical acceleration of the own-ship maneuvering such that the target remains within the area covered by the field of regard of the at least one passive sensor.
16. The method according to claim 14, further comprising:
   performing said kinematical acceleration of the own-ship maneuvering substantially in a direction opposite of the azimuth angular change rate and elevation angular change rate of the target, when projected onto a plane which has the line-of-sight vector to the target as a normal, when the target is in a forward facing sector of the field of regard of the at least one passive sensor.
17. The method according to claim 14, further comprising:
   rotating said kinematical acceleration of said own-ship maneuvering such that said kinematical acceleration is parallel to the upper and lower limits of the field of regard of said at least one passive sensor, if said significant kinematical acceleration of said own-ship maneuvering will cause the target to leave the field of regard of the at least one passive sensor.
18. The method according to claim 14, further comprising:
   performing said kinematical acceleration of the own-ship maneuvering such that, if the target is in the vicinity of the aerial platform, the risk of colliding with the target is not increased as compared to if the kinematical acceleration had not been performed.
19. A computer program product for use in a range estimation device, the computer program product comprising:
   a non-transitory computer readable medium;
   computer readable code stored on the computer readable medium, wherein the computer readable code when run in a control unit in said range estimation device causes said range estimation device to perform a method including:
   determining the characteristics of an own-ship maneuvering of an aerial platform based on range uncertainty estimations of said range estimation to said target; and
   generating commands with the control system to perform own-ship maneuvering if the range uncertainty estimations are above a predetermined acceptance level and if an azimuth annular change rate and elevation angular change rate of the target are below an angular rate limit set in view of a minimum estimated range to the target.

* * * * *